United States Patent
Helbig et al.

(10) Patent No.: US 12,181,845 B2
(45) Date of Patent: Dec. 31, 2024

(54) METHOD AND DEVICE FOR SUPPORTING MANEUVER PLANNING FOR AN AUTOMATED DRIVING VEHICLE OR A ROBOT

(71) Applicant: VOLKSWAGEN AKTIENGESELLSCHAFT, Wolfsburg (DE)

(72) Inventors: Micha Helbig, Braunschweig (DE); Jens Hoedt, Hannover (DE); Firas Al-Hafez, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 983 days.

(21) Appl. No.: 17/183,951

(22) Filed: Feb. 24, 2021

(65) Prior Publication Data
US 2021/0263526 A1    Aug. 26, 2021

(30) Foreign Application Priority Data
Feb. 24, 2020   (DE) ...................... 10 2020 202 350.6

(51) Int. Cl.
*G05B 13/02*    (2006.01)
*G05B 13/04*    (2006.01)

(52) U.S. Cl.
CPC ......... *G05B 13/0285* (2013.01); *G05B 13/04* (2013.01)

(58) Field of Classification Search
CPC ... G06N 3/04; G06N 3/08; G06N 7/01; G06F 30/27; G06F 2111/08; G05B 13/0285; G05B 13/04
See application file for complete search history.

(56) References Cited

FOREIGN PATENT DOCUMENTS

| WO | 2018147873 A1 | 8/2018 |
|---|---|---|
| WO | 2018172849 A1 | 9/2018 |

OTHER PUBLICATIONS

Xu et al., "A Reinforcement Learning Approach to Autonomous Decision Making of Intelligent Vehicles on Highways", 2018, IEEE Transactions on Systems, Man, and Cybernetics: Systems, pp. 1-14, doi: 10.1109/TSMC.2018.2870983 (Year: 2018).*

(Continued)

*Primary Examiner* — Li Wu Chang
(74) *Attorney, Agent, or Firm* — Barnes & Thornburg LLP

(57) ABSTRACT

A method for assisting maneuver planning for a transportation vehicle driving by automation or for a robot; wherein a state space of an environment of the transportation vehicle or the robot is discretely described by a Markov decision process; wherein optimal action values for discretized actions are determined by dynamic programming, based on discrete states in the state space; wherein a mapping with states in the state space as input values, and with action values for actions in the state space as output values, is learned by a reinforcement learning method; wherein a reinforcement learning agent is initialized based on the optimal action values determined by the dynamic programming; and wherein the learned mapping is provided for maneuver planning. Also disclosed is a device for assisting maneuver planning for a transportation vehicle driving by automation or for a robot.

15 Claims, 3 Drawing Sheets

(56) References Cited

OTHER PUBLICATIONS

Nagabandi et al., "Neural Network Dynamics for Model-Based Deep Reinforcement Learning with Model-Free Fine-Tuning," 2018 IEEE International Conference on Robotics and Automation (ICRA), Brisbane, QLD, Australia, 2018, pp. 7559-7566, doi: 10.1109/ICRA.2018.8463189 (Year: 2018).*

Choudhary et al., "Nuts & Bolts of Reinforcement Learning: Model Based Planning using Dynamic Programming", Sep. 18, 2018, Analytics Vidhya, the Wayback Machine (Year: 2018).*

Polydoros et al.; Survey of Model-Based Reinforcement Learning: Applications on Robotics; J Intell Robot Syst; 2017; vol. 86; pp. 153-173.

Wikipedia; Google translation of Bestärkendes Lernen; downloaded from https://de.wikipedia.org/w/index/.php?title=Best%C3%A4rkendes_Lernen@oldid=190814882; retrieved on Jan. 20, 2021 and Reinforcement learning; downloaded from https://en.wikipedia.org/wiki/Reinforcement_learning; retrieved on Feb. 25, 2021.

* cited by examiner

METHOD AND DEVICE FOR SUPPORTING MANEUVER PLANNING FOR AN AUTOMATED DRIVING VEHICLE OR A ROBOT

PRIORITY CLAIM

This patent application claims priority to German Patent Application No. 10 2020 202 350.6, filed 24 Feb. 2020, the disclosure of which is incorporated herein by reference in its entirety.

SUMMARY

Illustrative embodiments relate to a method and a device for assisting maneuver planning for a transportation vehicle driving by automation or for a robot.

BRIEF DESCRIPTION OF THE DRAWINGS

Disclosed embodiments will be described in greater detail below with reference to the figures. The following are shown.

DETAILED DESCRIPTION

Figure 1:
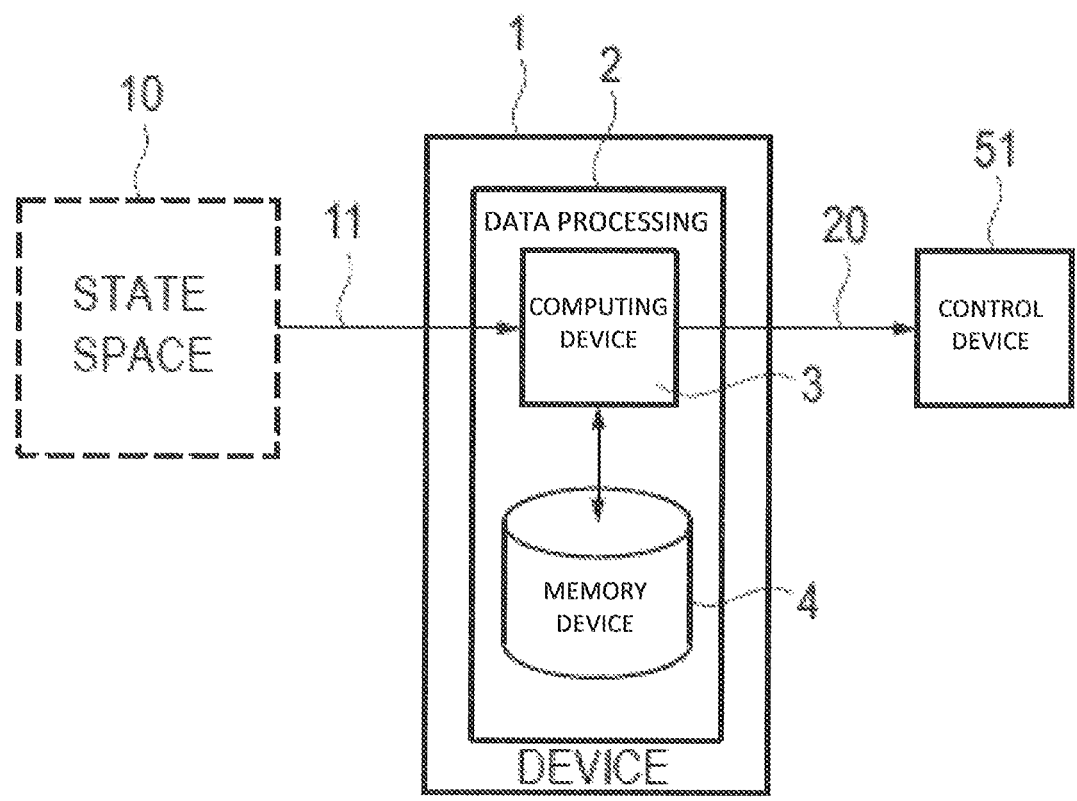
FIG. 1 depicts a schematic representation of an exemplary embodiment of the device for assisting maneuver planning for a transportation vehicle driving by automation or for a robot.

In transportation vehicles driving by automation, in addition to trajectory planning, i.e., providing a specific trajectory that is to be driven in a current situation, tactical maneuver planning is necessary within the scope of maneuver planning, to implement a higher-level strategy. A specific example of this is a turning situation in which there are several lanes and many other road users. It must then be decided when the transportation vehicle must be in which lane, for example, to carry out a turning maneuver in a manner that is as comfortable as possible for the occupants and/or that is optionally time-optimized; and it must be decided which other road users must be passed for this purpose. The same problem also arises in principle for robots operating by automation.

Reinforcement learning methods are known, with the aid of which the behavior of the other road users can be learned, and on the basis of which an optimal decision can be made. Here, a mapping is learned between a state and an optimal action corresponding thereto, with respect to an objective that is expressed via a reward value. In other words, the reinforcement learning agent attempts to find the action that maximizes the reward value. To find an optimal solution, a reinforcement learning agent must examine an environment thoroughly to ensure that an optimal solution is not overlooked. On the other hand, the agent can utilize situations already experienced at an earlier point in time, in which the agent found a good solution having a correspondingly high reward value.

Furthermore, Markov decision problems and the dynamic programming method are known.

Disclosed embodiments provide a method and a device for assisting maneuver planning for a transportation vehicle driving by automation or for a robot.

This is achieved via a disclosed method and a disclosed device.

In particular, a method is provided for assisting maneuver planning for a transportation vehicle driving by automation or for a robot; wherein a state space an environment of the transportation vehicle or the robot is discretely described by a Markov decision process; wherein optimal action values for discretized actions are determined by dynamic programming, based on discrete states in the state space; wherein a mapping with states in the state space as input values, and with action values for actions in the state space as output values, is learned by a reinforcement learning method; wherein a reinforcement learning agent is initialized on the basis of the optimal action values determined by the dynamic programming; and wherein the learned mapping is provided for maneuver planning.

Furthermore, a device is provided for assisting maneuver planning for a transportation vehicle driving by automation or for a robot, comprising a data processing device, wherein the data processing device is configured to describe a discrete state space of an environment of the transportation vehicle or the robot by a Markov decision process; to determine optimal action values for discretized actions by dynamic programming, based on discrete states in the state space; to use a reinforcement learning method for learning a mapping with states in the state space as input values, and with action values for actions in the state space as output values; and to initialize a reinforcement learning agent on the basis of the optimal action values determined by the dynamic programming; and to provide the learned mapping for maneuver planning.

The method and the device make it possible for the reinforcement learning agent not to have to begin from scratch when learning, but rather to be able to start already having an optimal solution, at least with respect to a number of discrete states in the state space. This is made possible in that optimal action values are determined by dynamic programming, for individual actions for discrete states in the state space, before applying the reinforcement learning. With the aid of optimal action values determined in this way, the mapping that is learned by the reinforcement learning agent is initialized. Thus, the reinforcement learning agent does not have to begin from scratch, but rather can build on the action values determined by the dynamic programming.

At least one benefit of the method and the device is that a learning time of the reinforcement learning can be significantly reduced. A further benefit is that, in addition, states that are otherwise visited very rarely or not at all by the reinforcement learning agent can thereby also be taken into consideration (if necessary, in a targeted manner). It is thereby possible to increase safety or quality with respect to the consideration of rare and/or extraordinary states in the state space.

A Markov decision process (MDP) is a model of decision problems. Here, a utility of an agent depends on a sequence of decisions, wherein the sequence comprises sequential state transitions between discrete states in a state space. For the individual state transitions, the Markov assumption applies here, i.e., a probability of reaching a state s' from state s depends only on s, and not on a history lying in the past, i.e., predecessors of s.

Dynamic programming is a method for solving an optimization problem by dividing a complex problem into simpler sub-problems or secondary problems. A solution is found in a recursive manner. In particular, dynamic programming is an algorithmic paradigm that describes a class of optimization methods that use a perfect model of an environment as a Markov decision process for solving a given problem. Dynamic programming is applied in a state space having discretized states. As a result, dynamic programming provides optimal action values as a measure of a reward for discretized actions, based on the discrete states in the state space.

Reinforcement learning is a machine learning method in which an agent learns a strategy autonomously to maximize rewards received. A reward can be both positive and negative. Based on the rewards received, the agent approximates a reward function that describes what value a state or an action has. In connection with actions, such a value is referred to in the present disclosure as an action value. Reinforcement learning methods consider an interaction by the agent with its environment, which is formulated as a Markov decision process. Based on a state that is provided, for example, derived from collected sensor data of at least one sensor, the agent can reach a different state by an action selected from a plurality of actions. Depending on the decision that was made, i.e., the action that was performed, the agent receives a reward. The agent has the task of maximizing a future expected profit that consists of discounted rewards, i.e., the total reward. At the end of the process, there is an approximated reward function for a given strategy, via which a reward value or action value can be provided or estimated for any action.

A state in the state space may comprise a plurality of variables or characteristics, i.e., a state is multidimensional. A state is thereby defined as a particular expression of these variables or characteristics. The states in the state space are selected discretely. The state space is a state space at a higher level; i.e., states are not mapped via raw sensor data, but rather via higher-valued features and characteristics that have been derived from raw sensor data, for example, by object and/or pattern recognition. States may, for example, comprise obstacle positions and/or obstacle velocities and/or a type or class of obstacles in the environment.

An action may, for example, comprise the following actions for a transportation vehicle: driving straight ahead using activated adaptive cruise control (ACC) (i.e., staying in the lane and not changing lanes), driving straight ahead (no acceleration), driving straight ahead and braking, changing lanes to the left lane, or changing lanes to the right lane.

A reward or an action value for an action in the state space may take the following influences into account: collision avoidance, path fidelity (i.e., no deviation or only a slight deviation from a path specified by a navigation device), time-optimal behavior, and/or comfort or convenience for transportation vehicle occupants.

It may be provided that the provision comprises transmission of the determined mapping to at least one control device. The provision may comprise loading the particular mapping into a memory of the at least one control device. The at least one control device is, for example, configured in a transportation vehicle or a robot, and is used there for maneuver planning.

Parts of the device, in particular, the data processing device, may be configured individually or collectively as a combination of hardware and software, for example, as program code that is executed on a microcontroller or microprocessor.

A vehicle is, in particular, a transportation vehicle. In principle, however, a vehicle may be another land, water, air, rail, or space vehicle. In principle, a robot may be configured in any manner, for example, as a transport robot, as a production robot, or as a care robot, etc.

In at least one disclosed embodiment, it is provided that the mapping has a table-like form. This constitutes a simple form of reinforcement learning that may also be referred to as "tabular reinforcement learning." Here, the action values that correspond to actions are linked to the individual states in the state space as table entries. The reinforcement learning agent can then invoke and modify the individual action values stored in the table within the scope of the learning process. For initialization, the action values for the respective states that are determined by the dynamic programming are stored in the table. The reinforcement learning method is then started.

In at least one disclosed embodiment, it is provided that the mapping is provided by a neural network, wherein the neural network is trained via supervised learning to initialize based on the determined optimal action values. This has the benefit that, despite initialization with discrete states, action values can also be provided subsequently for states of the state space lying between the discrete states. Once the supervised learning initialization is complete, the neural network continues to be trained by reinforcement learning. This takes place based on states of an actual environment. The neural network is configured as a deep neural network.

In at least one disclosed embodiment, it is provided that the discrete states are uniformly distributed in the state space or are chosen to be uniformly distributed. As a result, it can be ensured that the state space is mapped in a homogeneous manner. This is beneficial, since different characteristics of the states or of the variables describing the states can be taken into consideration in a uniform manner.

Alternatively or in addition, it may be provided that the discrete states in the state space are logarithmically distributed at least in regions, at least for a portion of the dimensions of the state space. As a result, it is possible, for example, for objects, for example, other transportation vehicles that are farther away from the transportation vehicle, to be taken less strongly into consideration than objects or other transportation vehicles that are situated closer to the transportation vehicle. This is, for example, achieved in that a distance between individual states in one dimension of the state space is chosen logarithmically as a function of a distance from the transportation vehicle. Resolution of the state space then decreases with increasing distance from the transportation vehicle.

In at least one disclosed embodiment, it is provided that the states have been chosen or are chosen in such a way that the states cover the entire state space. It can thus be ensured that the entire state space is mapped in a representative manner. This is particularly beneficial, since in this way, states that occur extremely rarely in reality can also be taken into consideration, which cannot be ensured in the case of actual states that, for example, are derived from collected sensor data.

In at least one disclosed embodiment, it is provided that the discrete states in the state space are at least partially generated by a simulation. As a result, any arbitrary states can be generated for the Markov decision process in a simple manner. Any arbitrary combinations of variables that describe a state can be generated by the simulation. In particular, states that occur extremely rarely can thereby also be generated and provided in a targeted manner.

In at least one disclosed embodiment, it is provided that in the reinforcement learning, states in the state space are at least partially generated by a simulation. As a result, in the reinforcement learning, it is also possible to generate and take into consideration any arbitrary states in a targeted manner. In this way, in addition to states that have been derived from collected sensor data, i.e., in addition to actual states, simulated states that, for example, map rare or critical states can also be used in the reinforcement learning.

Furthermore, a method is also provided for planning a maneuver for a transportation vehicle driving by automation or for a robot, wherein a mapping determined according to a disclosed method is used in maneuver planning.

Additional features for the design of the device result from the description of the exemplary method. The benefits of the disclosed device are respectively the same as those in the exemplary embodiments of the disclosed method.

FIG. 1 depicts a schematic representation of an exemplary embodiment of the device 1 for assisting maneuver planning for a transportation vehicle driving by automation or for a robot. The device 1 comprises a data processing device 2. The data processing device 2 comprises a computing device 3 and a storage device 4. The computing device 3 can access data stored in the storage device 4 and can execute computing operations on the data. In particular, the data processing device 2 executes the method described in the present disclosure.

In a first portion of the method, the data processing device 2 determines optimal action values for discretized actions by dynamic programming, based on discrete states 11 in a state space 10. The state space 10 maps an environment of the transportation vehicle or the robot. For this purpose, the state space 10 of the environment is described in discrete form by a Markov decision process. In particular, all physical variables and other variables that define a state 11 are respectively taken into consideration in discrete actions.

It may be provided that the discrete states 11 in the state space 10 are uniformly distributed or are chosen to be uniformly distributed.

Furthermore, it may be provided that the states 11 have been chosen or are chosen in such a way that the states cover the entire state space 10.

Furthermore, it may be provided that the discrete states 11 in the state space 10 are at least partially generated by a simulation. In particular, extremely rarely occurring states 11 may be generated by the simulation.

In a second portion of the method, a mapping 20 with states 11 in the state space 10 as input values, and with action values for actions in the state space 10 as output values, is learned by a reinforcement learning method. This takes place by the data processing device 2. Here, it is provided that a reinforcement learning agent is initialized on the basis of the optimal action values determined by the dynamic programming in the first part of the method. Thus, the reinforcement learning agent does not start from zero, but already has an optimal solution at least for the discrete states 11 that were available in the dynamic programming. A learning process following the initialization can thereby be improved, in particular, accelerated. Furthermore, extremely rare but possibly safety-relevant events can thus also be taken into consideration in that, for example, the events are generated in a targeted manner within the scope of a simulation.

The learned mapping 20 is provided for maneuver planning. Within the scope of the provision, it may be provided that the learned mapping 20 is loaded into a memory of a control device 51 of a transportation vehicle or a robot. There, the learned mapping 20 is used in the tactical maneuver planning, i.e., a current state from the state space 10 is provided to the mapping 20 as an input value, and the learned mapping 20 provides action values for actions that put the current state in a subsequent state, as an output value. The action values thus enable an evaluation of the respective action and thus tactical maneuver planning, i.e., a selection of an action as a function of the action values.

It may be provided that the mapping 20 has a table-like form. Here, the action values are stored as entries in a table, respectively linked to the states and the actions. In the reinforcement learning, the reinforcement learning agent initially uses the action values stored in the table, and can subsequently replace them with new values that have been determined within the scope of the reinforcement learning method.

Alternatively, it may be provided that the mapping 20 is provided by a neural network, wherein the neural network is trained via supervised learning to initialize based on the determined optimal action values. The neural network can subsequently also estimate action values for states other than the discrete states 11 in the state space 10. This makes it possible to train the neural network using a finite number of discrete states 11, but then also to apply the neural network to arbitrary states in the state space 10.

Figure 2:
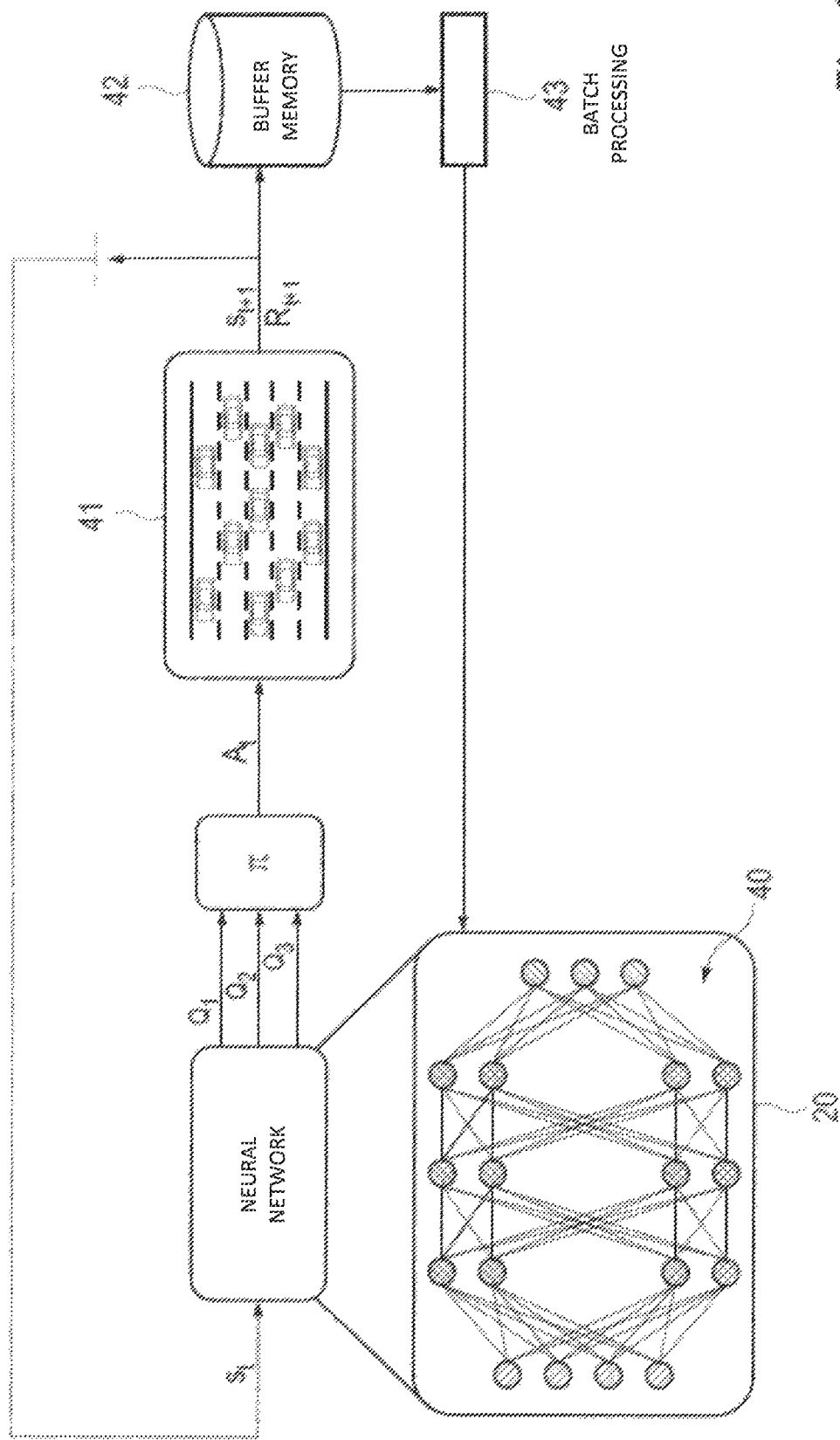
FIG. 2 depicts a schematic representation of the training of a neural network within the scope of reinforcement learning.

FIG. 2 depicts a schematic representation of the training of a neural network 40 for learning the mapping 20 by reinforcement learning. In this example, the training by reinforcement learning takes place with the aid of a simulated environment 41. Here, the simulated environment 41 is described as a Markov decision process. However, actual sensor data or states derived from collected sensor data may also be taken into consideration.

Prior to the training by the reinforcement learning method, the neural network 40 is trained by supervised learning (not depicted) for the purpose of initialization. For this purpose, the neural network 40 learns the action values determined in the first part of the method by dynamic programming. For this purpose, discrete states are provided to the neural network 40, and corresponding action values for discretized actions, which were determined by dynamic programming, are used as ground truth in the supervised learning. Once the neural network 40 has been initialized in such a manner, the neural network 40 is capable of estimating action values for actions based on arbitrary states in the state space.

Once the initialization is complete, the reinforcement learning method is carried out (FIG. 2). Within the scope of the reinforcement learning method, the neural network 40 is retrained, and thereby modifies the learned mapping 20. The retraining takes place by providing a time-discrete state st to the neural network 40. Based on this time-discrete state st, the neural network 40 estimates action values Qx for different actions that are possible from this state st. Based on a specified policy π, a time-discrete action At is selected for the time increment under consideration. This action At is carried out in the simulated environment 41, such that the simulated environment 41 is put into a state st+1. Simultaneously, a reward Rt+1 can be determined from the simulated environment 41, the reward being a measure of the utility of the action At. The state st+1 is again provided to the neural network 40, and the procedure described above is repeated.

In the depicted example, individual states st and the rewards Rt are not used immediately for retraining the neural network 40, but rather are held in a buffer memory 42. Once a specified quantity has been collected in the buffer memory 42, the neural network 40 is retrained by batch processing 43.

Figure 3:
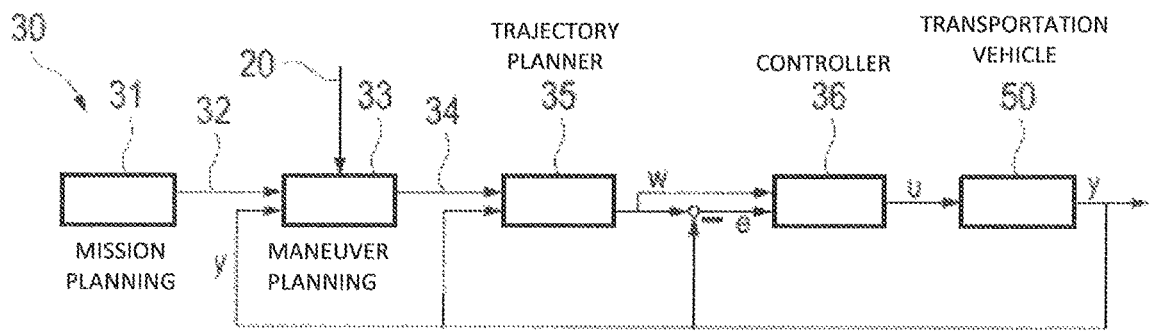
FIG. 3 depicts a schematic representation of a control structure for driving a transportation vehicle by automation, for illustrating the use of the mapping learned by the disclosed method.

FIG. 3 depicts a schematic representation of a control structure 30 for the automated driving of a transportation vehicle 50, for illustrating the use of the mapping 20 learned by the method described in the present disclosure. The control structure 30 comprises mission planning 31 by which strategic objectives are specified, for example, the shortest-possible travel route, the shortest-possible travel time, and/or the most energy-efficient and/or comfortable manner of driving, etc.

Taking into consideration the higher-level mission objectives 32, a driving path 34 is determined in tactical maneuver planning 33, using the mapping 20 learned by the method described in the present disclosure. In particular, based on a current state used as a controlled variable y, action values are determined by the learned mapping 20, for a plurality of possible actions that put the state into a subsequent state. The travel path 34 is determined by the action values estimated in this manner.

Based on the determined travel path 34 and the current state (controlled variable y), a trajectory planner 35 determines a specific trajectory for the transportation vehicle 50, which is transmitted to a controller 36 as a reference variable w. In particular, the controller 36 controls longitudinal guidance and transverse guidance of the transportation vehicle 50. For this purpose, the controller 36 determines a manipulated variable u from a control deviation e and the reference variable w, and provides the manipulated variable to an actuator system of the transportation vehicle 50.

Figure 4:
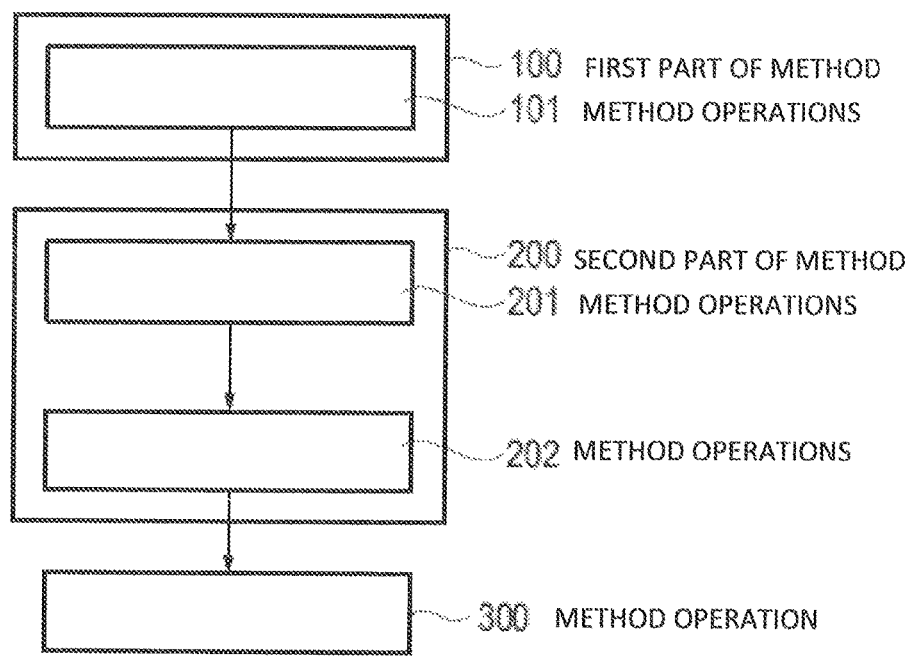
FIG. 4 depicts a schematic flow chart of an exemplary embodiment of the disclosed method for assisting maneuver planning for a transportation vehicle driving by automation or for a robot.

FIG. 4 depicts a schematic flow chart of an exemplary embodiment of the method for assisting maneuver planning for a transportation vehicle driving by automation or for a robot.

A first part 100 of the method comprises the method operation at 101. In method operation at 101, optimal action values are determined for discretized actions by dynamic programming, based on discrete states in the state space. For this purpose, the state space of an environment of the transportation vehicle or the robot is described in discrete form by a Markov decision process.

A second part 200 of the method comprises the method operations at 201 to 202.

In method operation at 201, a reinforcement learning agent is initialized on the basis of the optimal action values determined in method operation at 101 by the dynamic programming. A mapping with states in the state space as input values, and with action values for actions in the state space as output values, is defined for this purpose. The action values may be stored as a table, wherein the individual table entries respectively comprise the action values for individual discrete states and actions. Alternatively, a neural network may be used. The neural network learns the mapping on the basis of the optimal action values for the discrete states determined in method operation at 101. The neural network is thereby trained via supervised learning.

In a method operation at 202, a reinforcement learning method is carried out, wherein a reinforcement learning agent adjusts the mapping for this purpose via the reinforcement learning.

In a method operation at 300, the learned mapping is provided for maneuver planning. For this purpose, in particular, it may be provided that the learned mapping is loaded into a memory of a control unit of a transportation vehicle or a robot.

Subsequently, the learned mapping may be used in a method for planning a maneuver, for a transportation vehicle driving by automation or for a robot.

LIST OF REFERENCE CHARACTERS

1 Device
2 Data processing device
3 Computing device
4 Memory device
10 State space
11 State
20 Mapping
30 Control structure
31 Mission planning
32 Mission objectives
33 Maneuver planning
34 Travel path
35 Trajectory planner
36 Controller
40 Neural network
41 Simulated environment
42 Buffer memory
43 Batch processing
50 Transportation vehicle
$s_t$ State in time increment t
Qx Action value
$A_t$ Action in time increment t
$R_t$ Reward in time increment t
w Reference variable
e Control deviation
u Manipulated variable
y Controlled variable
100 First part of the method
101 Method operations
200 Second part of the method
201, 202 Method operations
300 Method operation

The invention claimed is:

1. A method for assisting maneuver planning for transportation vehicle driving by automation or for a robot, the method comprising:
   determining optimal action values for discretized actions by dynamic programming based on a plurality of discrete states in a state space of an environment of the transportation vehicle or the robot;
   initializing a reinforcement learning agent based on the optimal action values determined by the dynamic programming by learning a mapping between the plurality of discrete states in the state space, as input values, and action values for actions in the state space, as output values, wherein the discrete states and corresponding action values for discretized actions determined by the dynamic programming are used to initialize the reinforcement learning agent;
   following initialization of the reinforcement learning agent, using the reinforcement learning agent to perform a reinforcement learning method to adjust the learned mapping built based on the action values for the discretized actions determined by the dynamic programming; and
   providing the adjusted learned mapping for the maneuver planning,
   wherein the state space is described in discrete form by a Markov decision process,
   wherein the providing of the mapping is provided by a neural network that is trained via supervised learning to initialize the reinforcement learning agent based on the determined optimal action values determined by the dynamic programming, and wherein, following the initialization of the reinforcement learning agent based on the determined optimal action values, action values are also provided subsequently for states of the state space lying between the plurality of discrete states.

2. The method of claim 1, wherein the mapping is a table.

3. The method of claim 1, wherein the plurality of discrete states in the state space are uniformly distributed or are chosen to be uniformly distributed.

4. The method of claim 1, wherein the states in the state space that are input values cover the entire state space.

5. The method of claim 1, wherein the plurality of discrete states in the state space are at least partially generated by a simulation.

6. The method of claim 1, wherein, in the reinforcement learning method, states in the state space that are input values are at least partially generated using a simulation.

7. A method for planning the maneuver for the transportation vehicle driving by automation or for the robot, wherein the mapping determined according to the method of claim 1 and is used in maneuver planning.

8. A system for assisting maneuver planning for transportation vehicle driving by automation or for a robot, the system comprising:
a data processing device configured to:
describe a state space of an environment of the transportation vehicle or the robot by a Markov decision process,
determine optimal action values for discretized actions by dynamic programming based on a plurality of discrete states in the state space,
initialize a reinforcement learning agent based on the optimal action values determined by the dynamic programming by learning a mapping between the plurality of discrete states in the state space, as input values, and action values for actions in the state space, as output values, wherein the discrete states and corresponding action values for discretized actions determined by the dynamic programming are used to initialize the reinforcement learning agent,
following initialization of the reinforcement learning agent, using the reinforcement learning agent to perform a reinforcement learning method to adjust the learned mapping built based on the action values for the discretized actions determined by the dynamic programming, and
provide the adjusted learned mapping for the maneuver planning,
wherein the mapping is provided by a neural network that is trained via supervised learning to initialize the reinforcement learning agent based on the optimal action values determined by the dynamic programming, and
wherein, following the initialization of the reinforcement learning agent based on the determined optimal action values, action values are also provided subsequently for states of the state space lying between the plurality of discrete states.

9. A non-transitory computer readable medium including a computer program that includes commands that, when the computer program is executed by a computer, cause the computer to perform the method recited in claim 1.

10. The system of claim 8, wherein the mapping is a table.

11. The system of claim 8, wherein the discrete states in the state space are uniformly distributed or are chosen to be uniformly distributed.

12. The system of claim 8, wherein the states cover the entire state space.

13. The system of claim 8, wherein the discrete states in the state space are at least partially generated by a simulation.

14. The system of claim 8, wherein, in the reinforcement learning method, states in the state space are at least partially generated using a simulation.

15. A system for planning the maneuver for the transportation vehicle driving by automation or for the robot, wherein the mapping is determined by the system of claim 8 and is used in maneuver planning.

* * * * *